Nov. 23, 1971    M. SHACHTER    3,621,676
CONSTANT VELOCITY TYPE UNIVERSAL JOINT
Filed Dec. 29, 1969    3 Sheets-Sheet 2

INVENTOR
MOSES SHACHTER
BY John R. Faulkner
Roger E. Erickson
ATTORNEYS

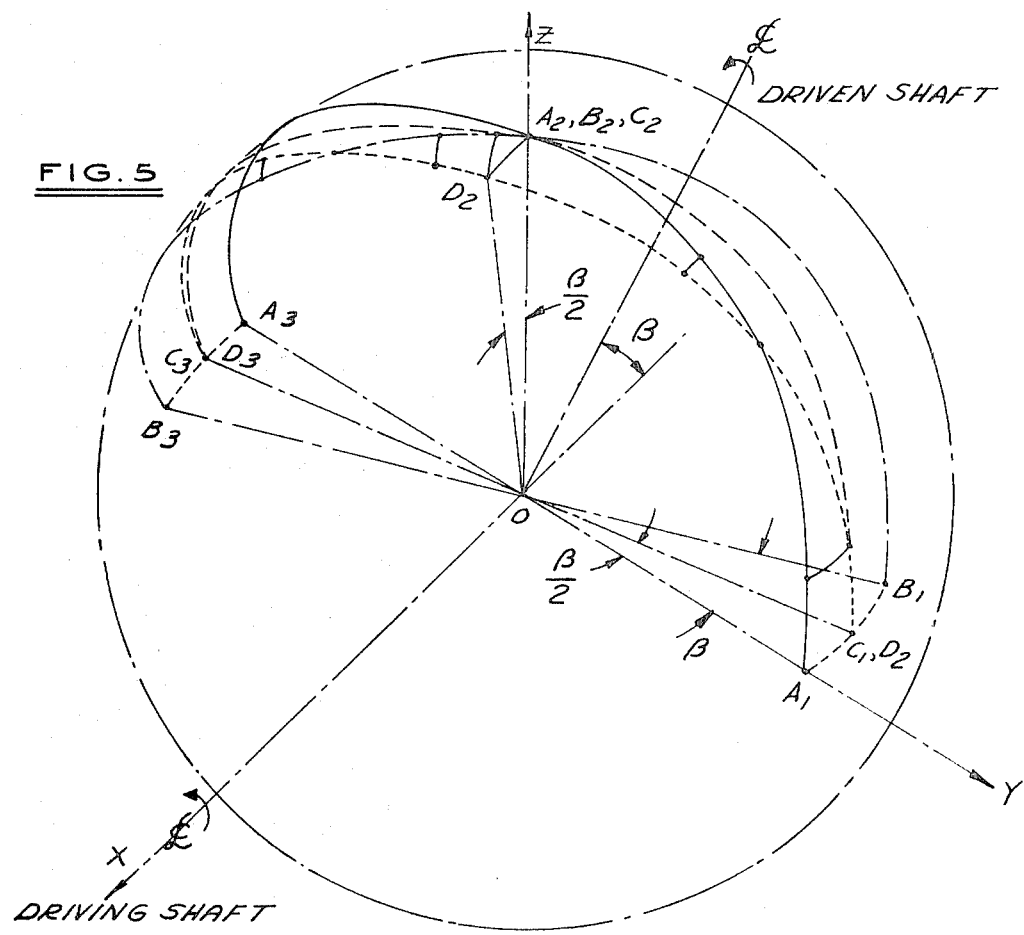
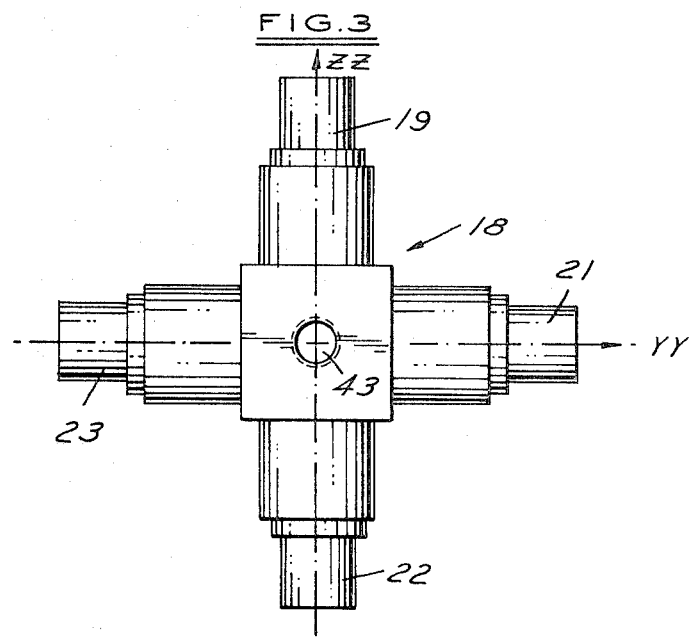

United States Patent Office 3,621,676
Patented Nov. 23, 1971

3,621,676
CONSTANT VELOCITY TYPE UNIVERSAL JOINT
Moses Shachter, Oak Park, Mich., assignor to Ford Motor Company, Dearborn, Mich.
Filed Dec. 29, 1969, Ser. No. 888,280
Int. Cl. F16d 3/30
U.S. Cl. 64—21                                         6 Claims

ABSTRACT OF THE DISCLOSURE

A constant velocity type universal joint having a driving yoke, a driven yoke and a torque transmitting intermediate cross assembly. The cross assembly includes gear means having sliding contacts with the yokes which function to maintain the cross member in a plane forming an angle with the bisecting plane equal to one-half the acute joint angle.

BACKGROUND OF THE INVENTION

Universal joints are used in applications where it is not possible to transmit a torque through a rigid shaft. Such joints permit the transmission of a torque from a driving shaft to a driven shaft when the two shafts are at an angle to each other. A common universal joint is the Cardan joint which includes a driving yoke, a driven yoke and a cross member pivotally interconnecting the yokes. A characteristic of the Cardan joint is that when the input angular velocity is constant, the output shaft angular velocity varies sinusoidally an amount proportional to the angle between the input and the output shafts. This velocity variation is often tolerable in applications requiring only small shaft angles, however, the variations may become objectionable in applications requiring relatively large shaft angles.

When the velocity variations of a simple Cardan joint are objectionable, a more sophisticated joint, commonly called a constant velocity joint or uniform motion joint, may be used. It should be noted that most joints referred to as constant velocity joints are in actuality only constant velocity type joints, which means that the joints substantially reduce rather than totally eliminate the input and output velocity variations as compared with a Cardan joint. Common disadvantages of constant velocity type joints as compared with simple Cardan joints are the relatively high costs of manufacture and the increased bulk.

This invention provides the construction for a constant velocity type of universal joint which has a high load capacity, is of a simple and efficient design, is quiet in operation and substantially eliminates variations between input and output velocities. It has been found that a universal joint constructed in accordance with this invention eliminates velocity variations to a significantly greater degree than comparable prior art devices.

The invention also provides a constant velocity type joint which is axially as well as radially compact.

Furthermore, the invention provides a constant velocity type joint which is economical to manufacture, that does not require a large number of highly precision parts and in which various plastic materials may be effectively utilized.

SUMMARY OF THE INVENTION

A constant velocity joint constructed in accordance with this invention includes a first yoke, a second yoke and an intermediate cross member constructed to transmit a torque from one yoke to the other. The cross member includes a first pair of legs slidably connected to the first yoke and a second pair of legs slidably connected to the second yoke. Bevel gears are rotatably mounted about each of the cross member legs. One pair of the bevel gears are meshed, the other pair are interconnected by an additional bevel gear mounted to the cross member. The bevel gears mounted about the cross member legs have sliding contacts with the first or second yokes. The cross member and bevel gears respond to relative movement between the first and second yokes to position the cross member in a plane forming an angle equal to one-half the acute joint angle with the bisecting plane of the obtuse joint angle.

BRIEF DESCRIPTION OF THE DRAWINGS

FIG. 2 is a view in the direction along line 2—2 of FIG. 4 showing certain components in section and certain components in elevation;

FIG. 3 is an elevational view of the cross member;

FIG. 4 is an elevational view of the joint assembly viewing the assembly in the same direction as in FIG. 1 but showing the yokes in an axially aligned position; and FIG. 5 is a diagrammatic view showing circular lines traced by certain points on a rotating joint assembly.

DESCRIPTION OF A PREFERRED EMBODIMENT

Figure 1:
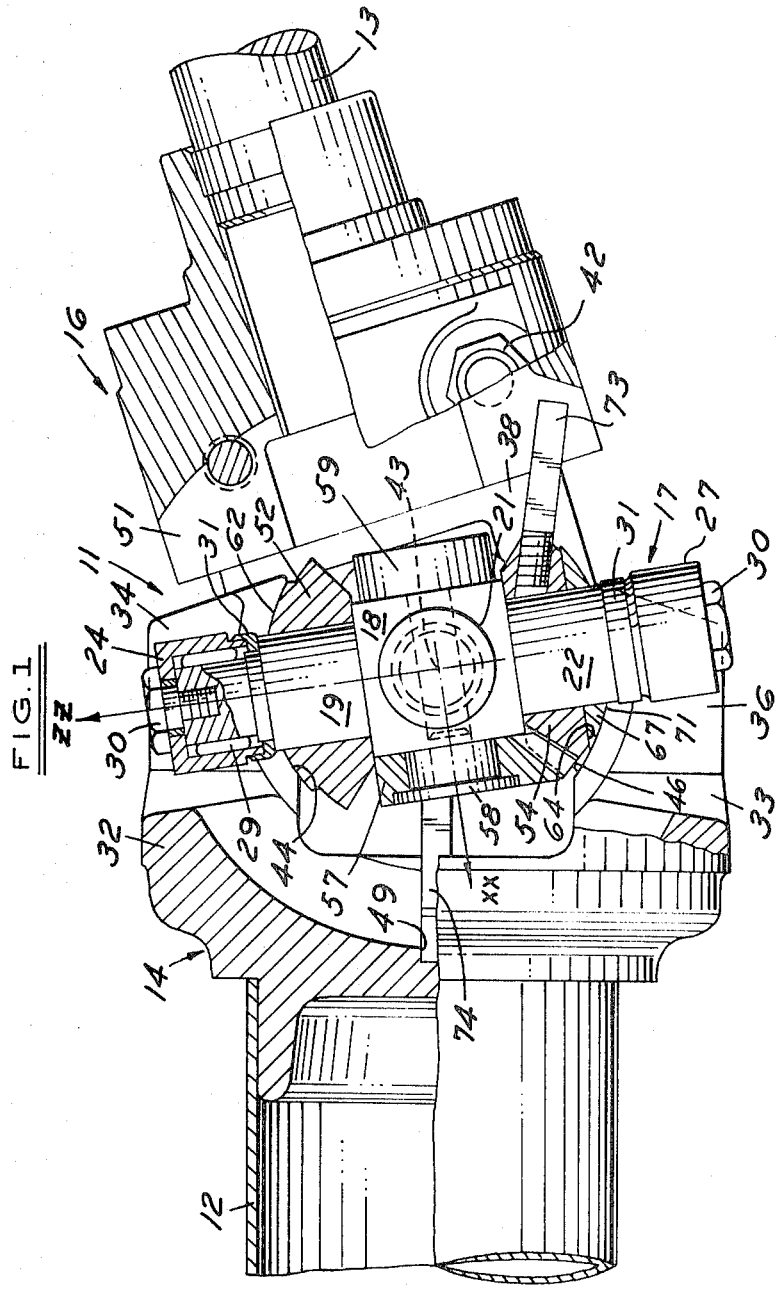
FIG. 1 is a view of the joint assembly partially in cross section and partially in elevation showing the yokes in an angular relationship.

Before describing the subject invention in detail, certain terminology will be explained. FIG. 5 is a diagrammatic representation of the geometry of a joint assembly. An XYZ coordinate system is shown in which the X and Y axes are considered to be in a horizontal plane and the Z axis is perpendicular thereto. The axis of the driving shaft and yoke and the X are identical. The axis of the driven shaft and yoke lies within the horizontal or XOY plane and intersects the driving yoke or X axis at an acute angle $\beta$, which is called the acute joint angle. The obtuse angle supplemental to angle $\beta$ is called the obtuse joint angle.

Line $A_1A_2A_3$ is a portion of a circle of radius R traced by a point B on the rotating driving yoke that lies in a plane perpendicular to the axis of the driving yoke passing through the original or joint center O. Similarly, line $B_1B_2B_3$ is a circle of radius R traced by a point A on the rotating driven yoke that lies in a plane perpendicular to the axis of the driven yoke passing through the joint center O. Line $C_1C_2C_3$ represents a circle of radius R lying in the plane which bisects the acute angle between the planes of circles $A_1A_2A_3$ and $B_1B_2B_3$. Plane $C_1C_2C_3$ is called the bisecting plane of the joint angle. Line $D_1D_2D_3$ is a circle of radius R traced by point on the axis of one of the cross member legs of the instant invention. The plane of circle $D_1D_2D_3$ makes an angle of $\beta/2$ with bisecting plane $C_1C_2C_3$ when the acute joint angle is $\beta$.

As diagrammatically shown in FIG. 5, the plane of the cross forms an angle equal to half the acute joint angle $\beta$ with the bisecting plane of the obtuse joint angle. The line of intersection of the two planes lies in the plane of the shafts. For every joint angle there are two such planes symmetrically spaced in respect to the bisecting plane. The cross must be located in one of them. As long as the joint angle remains constant, the cross rotates in the same plane. This is made possible by sliding contacts between the cross assembly elements and the yokes. Kinematic analysis of the subject joint yields the following equation describing the relationship between the driving and the driven shafts velocities:

$$\frac{\dot{\theta}}{\dot{\phi}} = \frac{[n \cos \theta - m(n-1) \sin \theta]^2 + \sin^2 \theta}{n} \quad (1)$$

where $\dot{\theta}$=driving shaft velocity,
$\dot{\phi}$=driven shaft velocity,
$\theta$=driving shaft angular displacement;

$m$ and $n$ are the following functions of joint angle $\beta$:

$$m = \frac{\sin^2 \beta/2}{\cos \beta/2} \quad (2)$$

$$n = \frac{1 + \cos^6 \beta/2}{\cos^2 \beta/2 (1 + \cos^2 \beta/2)} \quad (3)$$

Calculations show that the function expressed in Equation 1 achieves its maximum and minimum values when the value of $\theta$ is very close to 0° and 90°, respectively. Therefore:

$$\left(\frac{\dot{\theta}}{\dot{\phi}}\right)_{\max.} = n \quad (4)$$

$$\left(\frac{\dot{\theta}}{\dot{\phi}}\right)_{\min.} = \frac{m^2(n-1)^2 + 1}{n} \quad (5)$$

In a true constant velocity joint the relationship $$\frac{\dot{\theta}}{\dot{\phi}}$$

is always constant and usually equal to one. Since the relationship $$\frac{\dot{\theta}}{\dot{\phi}}$$

as expressed in the Equation 1, is a function of $\theta$ and $\beta$, the joint in question cannot be considered a true constant velocity joint. However, practical calculations of the values $$\left(\frac{\dot{\theta}}{\dot{\phi}}\right)_{\max.} - 1 \text{ and } 1 - \left(\frac{\dot{\theta}}{\dot{\phi}}\right)_{\min.}$$

which serve as indicators of the deviation from the constant velocity principle, reveal that they are negligibly small. For a joint angle $\beta = 5°$ the value of $$\left(\frac{\dot{\theta}}{\dot{\phi}}\right)_{\max.} - 1$$

is equal to $36 \times 10^{-7}$. In an ordinary Cardan joint, in which $$\left(\frac{\dot{\theta}}{\dot{\phi}}\right)_{\max.} = \frac{1}{\cos \beta}$$

the value of $$\left(\frac{\dot{\theta}}{\dot{\phi}}\right)_{\max.} - 1$$

for the same angle $\beta = 5°$ is equal to $38 \times 10^{-4}$. Therefore, the deviation from uniform motion in the joint in question is more than a thousand times smaller than in a Cardan joint. Calculations made for other values of the joint angle $\beta$, within the range of angles currently used for high speed applications, yield similarly insignificant values of deviation from uniform motion in the joint in question.

Needless to say that deviations of such a small magnitude need not be taken into account in practical applications. Therefore, for all practical purposes, the joint in question is a constant velocity joint.

Various mechanisms can be employed to keep the cross of the joint in the required plane. An example of such a joint with an adjusting mechanism that employs planetary gears is described below.

The universal joint assembly illustrated in the drawings and described in detail in following paragraphs represents a low-cost joint which reduces the variations between input and output velocities to a magnitude not before achieved with a comparable joint utilizing a pair of yokes and an intermediate cross member. It has been found that the velocity vibrations of the present invention yield more nearly constant velocity than does a joint in which the cross member is at all times positioned in a plane which bisects the joint angle formed by the axes of the yokes. Two such joints are shown in U.S. Pat. Nos. 3,477,247 and 3,477,248.

A constant velocity type universal joint assembly constructed in accordance with this invention is referred to generally in the drawings by numeral 11. The assembly 11 links two shafts 12 and 13 and comprises essentially two yokes 14 and 16 and an intermediate cross assembly 17.

The cross assembly 17 includes a cross member 18 having four identical, coplanar legs 19, 21, 22 and 23 intersecting at right angles. One of four identical rollers 24, 26, 27 and 28 is rotatably secured to each of the end portions of the cross member legs. Needle bearings 29 may be used to reduce friction between the legs and the rollers. Cap screws 30 are threadedly received in the ends of legs 19, 21, 22 and 23 to retain the rollers about the end portions of the legs. Dirt shields 31 are positioned about each of the rollers 24, 26, 27 and 28 adjacent their inner openings.

Yoke 14 has two arm portions 32 and 33 which extend toward the cross assembly 17. The arm portions have two axially extending slots 34 and 36 slidingly receiving axially opposed rollers 24 and 27, respectively. Similarly, yoke 16 has two arm portions 37 and 38 having two axially extending slots 39 and 41 slidingly receiving the other axially opposed rollers 26 and 28, respectively. A torque is transmitted from yoke 14 to yoke 16 via the rollers 24 and 27 received in slots 34 and 36, through the cross member 18 and, finally, through the rollers 26 and 28 received in slots 39 and 41 of yoke 16.

Each of yokes 14 and 16 has identical functional geometry; however, yoke 14 differs structurally from yoke 16, as illustrated in the drawings, in that yoke 16 has several elemental parts held together as a unit by cap screws 42, while yoke 14 is a one-piece construction. The multi-element construction is designed to ease final assembly of the joint 11. When assembled, yoke 14 is axially rotated 90° relative to yoke 16.

A reference point 43 is defined as the joint center or the intersection of the axis of rotation of shaft 12 and yoke 14 with the axis of rotation of shaft 13 and yoke 16. Radially inwardly facing surfaces 44 and 46 of the yoke arms 32 and 33, respectively, are cylindrical arcs having a common central axis perpendicular to the axis of rotation of shaft 12 and passing through reference point 43. Similarly, the radially inwardly facing surfaces 47 and 48 of the yoke arms 37 and 38 are cylindrical arcs having a common central axis perpendicular to the axis of rotation of shaft 13 and passing through reference point 43. A channel 49 is formed within yoke 14, located midway between the yoke arms 32 and 33 extending axially toward shaft 12. A similar channel 51 is formed within yoke 16, located midway between arms 37 and 48 and extending axially toward shaft 13.

Bevel gears 52, 53, 54 and 56 rotatably engage the intermediate portions of cross member legs 19, 21, 22 and 23, respectively. The gear teeth have a 45° bevel and fill only a portion of the gear periphery. Gears 53 and 54 have perpendicular axes and are interconnected by an intermediate bevel gear 57 which is rotatably mounted to cross member element 18 by threaded member 58. Gears 52 and 56 also have perpendicular axes and have directly meshing teeth, respectively. A counterweight 59 is mounted to cross member 18 opposite intermediate gear 57. The axis of gear 57 is perpendicular to both the common axis of gears 52 and 54 and the common axis of gears 53 and 56.

Bevel gears 52 and 53 have outwardly facing cylindrical arc surfaces 62 and 63 which engage yoke arm surfaces 44 and 47, respectively. Bevel gears 54 and 56 have outwardly facing plane surfaces 64 and 66 which slidingly engage corresponding surfaces of washers 67 and 68, respectively. Washers 67 and 68 have outwardly facing cylindrical arc surfaces 69 and 71 which correspond to and engage yoke arm surfaces 46 and 48, respectively. These mating cylindrical arc surfaces permit angular movement of gear 52 and washer 67 relative to yoke 14 about the common axis of cylindrical arc surfaces 44 and 46. Similarly, angular movement of gear 53 and washer 68 relative to yoke 16 is permitted about the common axis of cylindrical arc surfaces 47 and 48.

Connecting rods 73 and 74 project from gears 54 and 56 and extend into channels 51 and 49, respectively. The width of channels 49 and 51 is approximately equal to the individual width of one of the connecting rods so that relative angular movements between a yoke and a rod is permitted in the direction of the length of the channel, but is precluded in other directions.

OPERATION

A moving coordinate system will be defined for the purpose of considering the interaction of the cross assembly elements. A YY axis and a ZZ axis are defined as the axis of legs 21 and 23 and the axis of legs 19 and 22, respectively. An XX axis is defined as perpendicular to the YY and ZZ axes and passing through their intersection at reference point 43.

The origin of the coordinate system coincides with the reference point 43. The positive direction of each of the coordinate axes is indicated by means of arrows in FIGS. 1, 2 and 3. We consider rotation of any component of the joint as clockwise or counterclockwise according to how we see it when looking from the positive part of the axis toward the origin.

Pivoting the yoke 16 an angle $\beta$ counterclockwise about the YY axis to the position shown in FIG. 1 causes gear 53 to turn the same angle counterclockwise about the YY axis. Pins 73 and 74 prevent gears 54 and 56 from rotation about the axes ZZ and YY, respectively. Gear 52 is prevented from rotation about the ZZ axis by the cylindrical fit of its surface 62 with the corresponding surface 44 of yoke 14. As a result of these constraints, cross member 18 turn half the angle $\beta$ counterclockwise about the YY axis. Gear 57 has turned half the angle $\beta$ clockwise about XX axis.

Pivoting the yoke 14 an angle $\beta$ clockwise about the ZZ axis causes gear 52 to turn the same angle clockwise about the ZZ axis. Pins 73 and 74 prevent gears 54 and 56 from rotation about the axes ZZ and YY, respectively. The gear 53 is prevented from rotation about the YY axis by the cylindrical fit of its surface 63 with the corresponding surface 47 of yoke 16. As a result of these constraints the cross member 18 turns half the angle $\beta$ clockwise about the ZZ axis and half the angle $\beta$ counterclockwise about the YY axis. Gear 57 turns half the angle $\beta$ counterclockwise about the XX axis. Therefore, pivoting either of the two yokes 14 or 16 an angle $\beta$ about one of the YY or ZZ axes of the cross member causes the cross member to turn half the angle $\beta$ about the same axis and in the same direction as the yoke and half the angle $\beta$ about the second axis of the cross member in a direction that depends on the gear arrangement.

As a result of this, for any given joint angle $\beta$ the cross member remains in a plane that forms half the acute joint angle $\beta$ with the plane bisecting the obtuse joint angle. The line of the intersection of the plane of the cross with the bisecting plane lies in the plane of the axes of the shafts.

I claim:

1. A constant velocity type universal joint comprising:
    a first yoke and a second yoke, the axis of said second yoke forming an acute joint angle and a supplemental obtuse joint angle with the axis of said first yoke,
    a cross member intermediate said yokes constructed to transmit a torque from one yoke to the other, said cross member having four legs intersecting at right angles,
    cross member positioning elements rotatably mounted on each of said legs,
    an adjacent pair of said elements in mutual engagement,
    the other adjacent pair of said elements being spaced apart,
    motion transfer means mounted to said cross member interconnecting said other adjacent pair of elements,
    said cross member positioning elements having sliding contacts with said first and second yokes and constructed to position said cross member in a plane forming an angle with the obtuse joint angle bisecting plane equal to one-half the acute joint angle so that the line of intersection of the plane of the cross member and the bisecting plane lies in a plane containing the axes of said first and second yokes.

2. A constant velocity type universal joint comprising:
    a first yoke and a second yoke, the axis of said second yoke forming an acute joint angle and a supplemental obtuse joint angle with the axis of said first yoke,
    a cross assembly intermediate said yokes constructed to transmit a torque from one yoke to the other, said cross assembly having elements including:
    a cross member having four legs intersecting at right angles,
    gear means rotatably mounted about each of said legs,
    motion transfer means pivotally mounted to said cross member interconnecting a first pair of said gear means,
    a second pair of said gear means having gear teeth in meshing engagement,
    said cross assembly having sliding contacts with said first and second yokes and constructed to position said cross member in a plane forming an angle with the obtuse joint angle bisecting plane equal to one-half the acute joint angle.

3. A constant velocity type universal joint comprising:
    a first yoke and a second yoke,
    a cross assembly having elements including:
    a cross member having four legs intersecting at right angles, the axes of said legs defining a first axis and a second axis perpendicular to said first axis, a third axis being defined as perpendicular to said first and second axes and passing through the intersection thereof,
    a first bevel gear means pivotal about said first axis received about a first of said legs and having a plurality of peripherally disposed teeth,
    a second bevel gear means pivotal about said second axis received about a second of said legs and having a plurality of peripherally disposed teeth meshing with the teeth of said first bevel gear,
    a third bevel gear means pivotal about said first axis received about a third of said legs and having a plurality of peripherally disposed teeth,
    a fourth bevel gear means pivotal about said second axis received about a fourth of said legs and having a plurality of peripherally disposed teeth,
    a fifth bevel gear means pivotal about said third axis having a plurality of peripheral teeth meshing with the teeth of said third and fourth gear means,
    said cross assembly having sliding contacts with said first and second yokes constructed to position the first and second axes of said cross member legs in a plane forming an angle with the obtuse joint angle bisecting plane equal to one-half the acute joint angle.

4. A constant velocity type universal joint according to claim 3 and including:
    said yokes each having two arm portions, an axially disposed slot formed in each arm portion,
    portions of said cross assembly being slidingly received received in said slots.

5. A constant velocity type universal joint according to claim 3 and including:
   one of said sliding contacts comprising a pair of inwardly facing cylindrical arc surfaces of a common radius on one of said yoke members,
   a corresponding pair of outwardly facing cylindrical arc surfaces of said common radius on a first pair of elements of said cross assembly,
   another of said sliding contacts comprising a pair of inwardly facing cylindrical arc surfaces of said common radius on the other of said yoke members,
   a corresponding pair of outwardly facing cylindrical arc surfaces of a said common radius on a second pair of elements of said cross assembly,
   said cylindrical arc surfaces having sliding engagement for pivotal movement of said yokes relative to said cross assembly about the axes of said cylindrical arc surfaces.

6. A constant velocity type universal joint according to claim 3 and including:
   one of said sliding contacts comprising a first channel extending axially into one of said yokes, and
   first connecting rod means secured to and extending from one of said gears into said channel,
   another of said sliding contacts comprising a second channel extending axially into the other of said yokes, and
   second connecting rod means secured to and extending from another of said gears into said second channel,
   said connecting rod means having a width approximately equal to the width of said channels.

References Cited

UNITED STATES PATENTS

| | | | |
|---|---|---|---|
| 3,036,446 | 5/1962 | Morgenstern | 64—21 X |
| 3,477,247 | 11/1969 | Shachter | 64—21 |

EDWARD G. FAVORS, Primary Examiner